Figure 1:
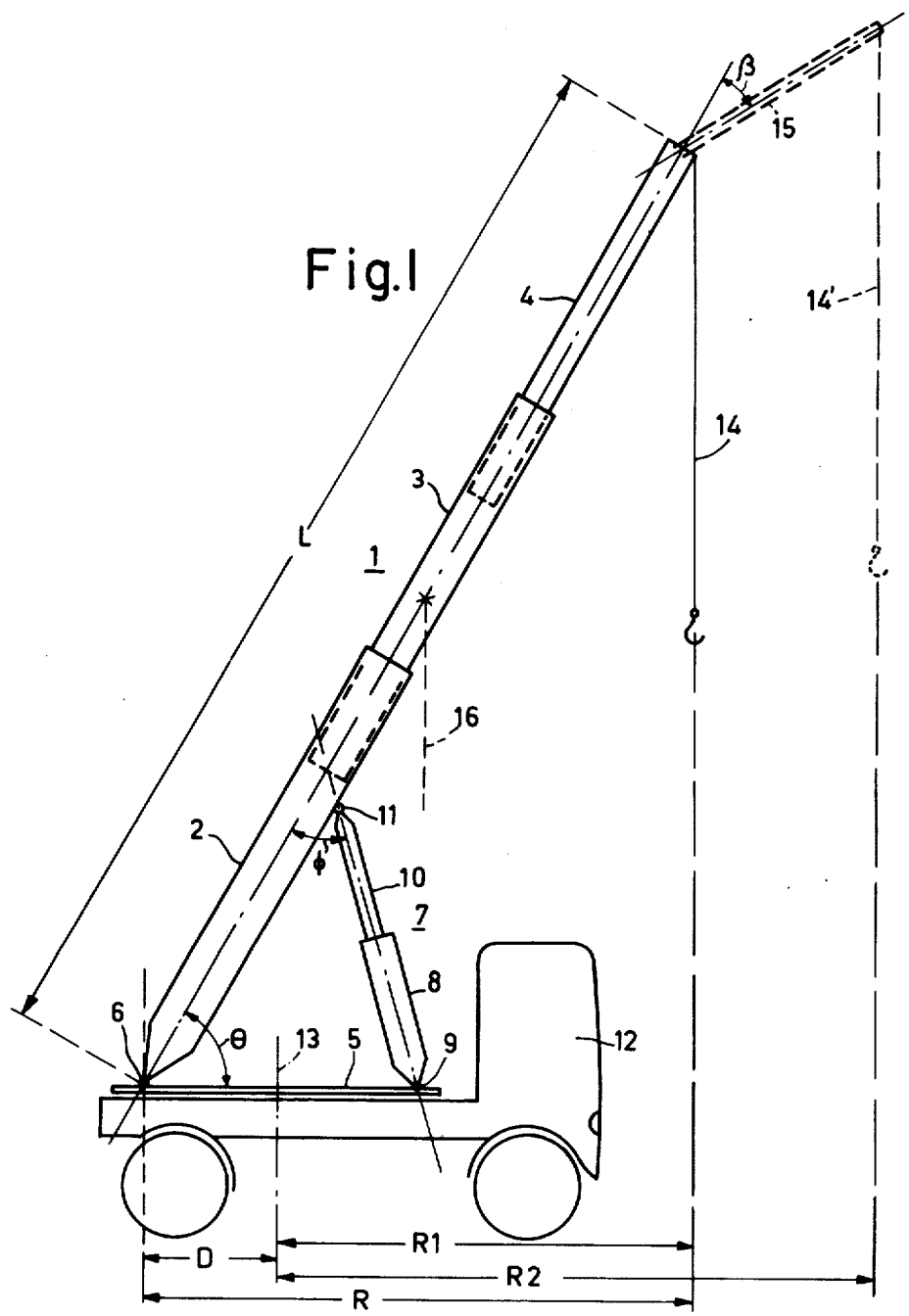

United States Patent
Hubbard et al.

[11] 4,063,649
[45] Dec. 20, 1977

[54] CALIBRATION OF CRANE LOAD INDICATING ARRANGEMENT

[75] Inventors: Robert William Hubbard, Southend-on-Sea; Timothy John Archer Davis, Westcliff-on-Sea, both of England

[73] Assignee: Pye Limited, Cambridge, England

[21] Appl. No.: 629,147

[22] Filed: Nov. 5, 1975

[30] Foreign Application Priority Data

Nov. 22, 1974  United Kingdom ............... 50773/74

[51] Int. Cl.² .................... B66C 13/16; B66C 23/90
[52] U.S. Cl. ..................... 212/39 R; 340/177 CA; 340/267 C
[58] Field of Search ..................... 340/267 C, 177 CA; 73/65; 214/762; 212/39, 1

[56] References Cited
U.S. PATENT DOCUMENTS 4,003,482   1/1977   Cheze ............................... 340/267 C Primary Examiner—Robert J. Spar
Assistant Examiner—Carl Rowold
Attorney, Agent, or Firm—Frank R. Trifari; Bernard Franzblau

[57] ABSTRACT

A device for the calibration of the safe load indicating apparatus on cranes and derricks that have a pivoted, extensible boom luffed by a hydraulic ram. The device operates by combining electrical signals corresponding to the actual turning moment of the unloaded boom at given boom positions with generated calibration signals corresponding to the turning moment for the theoretical maximum load at the boom positions, by comparing these combined signals to the safe load signals from the crane's law generator unit and by adjusting the law generator unit accordingly.

9 Claims, 5 Drawing Figures

CALIBRATION OF CRANE LOAD INDICATING ARRANGEMENT

This invention relates to a method and apparatus for the calibration of safe load indicating apparatus for use with cranes, derricks and other lifting apparatus of the type having a pivoted, extensible boom which can be luffed by an hydraulic ram or other boom supporting means. It has particular but not exclusive application to the calibration of safe load indicating apparatus used on mobile cranes having an extensible boom which can be slewed through the whole or part of a circle.

A typical mobile crane has a boom comprising a plurality of telescoping sections, of which the lowermost is pivoted to a base unit for luffing movement by means of an hydraulic ram. One end of the ram is also pivoted to the base unit and the other end is pivoted to a point on the lowermost section of the boom so as to support the boom at an angle (the luff angle) to the horizontal which is determined by the extension of the ram. The base unit is mounted on a road or rail chassis and is arranged to slew through the whole or part of a circle about a vertical axis.

The chassis may be provided with outriggers or blocking girders, which are carried in a stowed position when the crane is in road trim, but which can be extended outwards from the chassis and have their outer ends blocked up from the ground in order to increase the crane's stability and to relieve the load on the road wheels.

For basic duties of the crane, a load is supported by a hoist rope passing over a sheave at the outer end of the boom. The crane can lift loads located within a range of radii measured from its slewing centre. For lifting light loads, a fly jib may be secured to the outer end of the boom and the hoist rope passed over a sheave at the extremity of the fly jib. This increases the radius of action of the crane.

Such a crane has a number of possible modes of operation, for example, blocked, free on wheels, and with and without fly jib. In whatever mode the crane is operated, the load must be limited so that the overturning moment which it produces does not imperil the stability of the crane and also so that no component part of the crane is overstressed.

The crane manufacturer prepares rating tables which give the maximum permissible loads which the crane may lift. A separate table is prepared for each permissible mode of operation. For most modes, the prime consideration is stability and the maximum safe load is related to radius from the slewing centre. When a fly jib, which is usually of much lighter construction than the main boom, is used, the strength of the fly may be the limiting factor. For modes of operation where this is true, the maximum safe load is related to luff angle. A typical rating table gives values of maximum safe load corresponding to the maximum and minimum values of radius or luff angle, as the case may be, which the crane can attain in the relevant mode of operation and also load values corresponding to a number of values of radius or luff angle intermediate these limits. For values of radius or luff angle not given in the table, the maximum safe load may be obtained by interpolation.

Safe load indicating equipment is known of the general type in which the total turning moment of the boom about its pivot is determined in terms of the reaction sustained by the boom support means in supporting the weight of the boom and the weight of any load suspended therefrom. In this context the term "weight of the boom" is meant to embrace the weight of the boom with or without fly jib together with the weights of the sheave, hoist rope, hook etc., that is the total weight of the structure which supports the load but excluding the weight of the load.

A first form of safe load indicating equipment of this type is described in our British Patent Specification No. 1360128 and comprises means for producing a first output signal representative of the total turning moment of the boom about its pivot in supporting a load, means for producing a second output signal representative of the turning moment of the boom about its pivot due to the weight of the boom alone, means for producing a third output signal representative of the algebraic difference between the said first and second output signals, and hence representative of the turning moment due to the load, means for producing a fourth output signal representative of the horizontal distance of the load from the boom pivot point and means for dividing the said third output signal by the fourth output signal to produce a fifth output signal representative of the weight of the load.

The equipment further comprises, in respect of each mode of operation of the crane, a law generator unit, each unit being adapted to produce a sixth output signal representative of the maximum safe load of the crane in that mode of operation for the load radius (for radius-related modes) or luff angle (for angle related modes) currently obtaining, together with means for comparing the said fifth and sixth output signals to provide a seventh output signal giving an indication of available lifting capacity.

A second form of equipment of this type is described in U.S. Pat. No. 3,965,733 and comprises means for producing first, second and third output signals as hereinbefore described. The equipment further comprises, for each mode of operation of the crane, a law generator unit, in respect of each mode of operation of the crane, each unit being adapted to produce an output signal representative of the maximum safe load moment in the appertaining mode of operation for the load radius currently obtaining, and means for comparing said third output signal and said law generator output signal to provide an indication of available lifting capacity.

A third form of the equipment is described in U.S. Pat. No. 3,913,690. The third form comprises means for producing a first output signal as hereinbefore described, means for producing an output signal representative of the load radius, means for dividing the first output signal by the load radius output signal to produce an output signal representative of the total effective load, where total effective load means the sum of the actual load suspended from the hook and an equivalent load which would if suspended from the hook produce the same turning moment about the boom pivot point as does the weight of the boom acting through the centre of gravity of the boom.

The third form further comprises means for producing a further output signal representative of the change of position of the boom centre of gravity with change of boom length and hence representative of the said equivalent load, means for combining said further output signal with said total effective load signal to produce a corrected effective load output signal, a law generator unit in respect of each mode of operation of the crane, each unit being adapted to produce an output signal representative of the maximum safe load in the appertaining mode for the load radius or luff angle currently obtaining, and means for comparing the corrected effective load output signal with the law generator output signal to provide an indication of available lifting capacity.

Similar law generator units are employed in all three forms of the equipment. For modes of operation in which the maximum safe load is related to radius from the crane slewing centre, the respective law generator units are responsive to an input signal derived from the hereinbefore-mentioned output signal representative of the horizontal distance between the boom pivot point and the load, modified to take account of any horizontal offset between the boom pivot point and the slewing centre. For angle related modes, the respective law generator units are responsive to an inut signal derived from a luff angle sensor. Each law generator unit is preferably brought into operation selectively by means of mode sensors which are adapted to be activated selectively as the crane is set up for different modes of operation.

In a typical law generator unit the input/output characteristic is a curve comprising a number (typically five) of linear sections, both the slopes of the individual sections and the break points between sections being separately adjustable. A law generator unit for a particular operating mode is set up so that for each value of input signal corresponding to a value of load radius or luff angle specified in the rating table for that mode, the value of the output signal is representative of the corresponding maximum safe load specified in the table, or in the case of a law generator for the second type of equipment hereinbefore described, of the turning moment which would be produced by that maximum safe load. If the input signal is varied linearly from one specified level to the next, the output changes linearly between the corresponding safe load values. Thus the overall characteristic corresponds to the manufacturer's rating of the crane for that mode of operation.

When the apparatus is installed on a crane, an initial ccalibration procedure is followed whereby the various sensors for luff angle, boom extension, etc. and their associated circuits are adjusted so that the output signals representative of luff angle, load radius etc. correspond to the measured values. The crane is then set up for operation in a particular mode with its boom in a limiting condition, e.g. maximum extension and maximum luff angle as specified in the manufacturer's rating table and the specified maximum safe load for that condition is lifted.

The gain of an amplifier associated with the transducer means for measuring the reaction sustained by the boom support means is varied until the magnitude of the first output signal (representative of total turning moment) becomes such that the apparatus indicates that the crane is lifting the maximum load for the specified condition.

If the crane were then set to any other combination of boom extension and luff angle specified in the rating table and the maximum load for that combination were lifted, the equipment should theoretically give a maximum safe load indication. In practice it may be found that an erroneous indication is given, either that the crane is overloaded, or that it still has lifting capacity available. This error, if present, is caused by a discrepancy between the actual and the calculated positions of the centre of gravity of the boom. Such a discrepancy may be caused by manufacturing tolerances whereby the weights of the various sections of the boom and/or the locations of their individual centres of gravity differ from their theoretical values.

Since in the first and second forms of the safe load measuring equipment the second output signal, representative of the turning moment due to the weight of the boom alone, and in the third form of the equipment the signal representative of the equivalent load are produced by circuit means which take account of the calculated position of the centre of gravity of the boom, it follows that if any discrepancy exists between the actual and the calculated positions, these signals will contain an error component, which will cause the aforesaid erroneous indication. It is known to correct for any such error component by a further or second stage calibration procedure, whereby a compensating offset is introduced into the output signal from the law generator unit.

The initial calibration procedure hereinbefore described is carried out, resulting in the equipment giving a correct indication when the crane is lifting the maximum safe load for one, limiting, combination of boom extension and/or luff angle specified in the rating table. The second-stage calibration procedure heretofore used is as follows:

The boom is set successively to each of the other combinations of extension and/or luff angle specified in the rating table, and at each setting the specified maximum safe load is lifted. It will be appreciated that the various settings correspond to break points in the input-/output characteristic of the law generator unit for the mode in which the crane is operated. At each setting, the slope of the relevant section of the law generator characteristic is adjusted to produce an offset in the law generator output signal of such sign and magnitude as to compensate for any error in the signal representative of the boom turning moment, and so to cause the equipment to indicate that the maximum safe load for that setting is being lifted.

This second-stage calibration procedure must be repeated for all other possible modes of operation of the crane, since each mode has its individual law generator. It therefore entails the provision of a considerable number of test loads, each of accurately-known weight, in addition to the test loads necessary for the initial calibration procedure, and is extremely laborious and time consuming.

It is an object of the present invention to provide a simpler and more expeditious method of carrying out second-stage calibration of the safe load indicating equipment. Advantage is taken of the facts that, firstly, when the boom is set to given conditions of extension and luff angle, i.e. so as to produce a given load radius, but no load is suspended therefrom, the aforesaid first signal is representative of the actual turning moment due to the weight of the boom alone, secondly, the turning moment which would be produced by the weight of a load alone, suspended at the given load radius, may be accurately calculated, and thirdly, the magnitude of a signal representative of the moment due to the weight of the load alone may also be calculated.

According to the invention, a method of performing second-stage calibration of a crane safe load indicating equipment of the type hereinbefore described comprises the steps of:

i. setting up the crane for operation in a particular mode ii. setting the boom to a configuration specified in the rating table for that mode, but with no load suspended therefrom iii. injecting into the safe load indicating equipment so as to be additive to the first signal produced therein a calibration signal representative of the calculated turning moment about the boom pivot point which would be produced by the maximum safe load specified in the rating table for the existing boom configuration.

iv. adjusting the slope of the relevant section of the input/output characteristics of the law generator unit for the appertaining mode so as to produce from the safe load indicating equipment an indication that the crane is lifting the maximum safe load for the existing boom configuration.

The boom is then set successively to the other configurations specified in the rating table for the mode, and at each setting, steps (iii) and (iv) of the above procedure are carried out.

The procedure is repeated for each of the possible modes of operation of the crane.

Apparatus according to the invention comprises a source of calibration signals whose output is presettable to any one of a plurality of voltage levels, each level being representative of the turning moment due to the maximum safe load for a particular boom configuration, together with means for adding the calibration signal to the first output signal of the safe load indicating equipment. The source of calibration signals may comprise a potentiometer connected across a stabilised reference voltage supply, which supply may conveniently be a supply already present in the safe load indicating equipment. Voltage measuring means may be connected to the slider of the potentiometer, for use in setting the level of the calibration signal. The slider of the potentiometer may be connected to an input of a unity gain non-inverting amplifier, to which input the first output signal aforesaid is also connected, the output from the amplifier then being the sum of the first output signal and the calibration signal.

Figure 2:
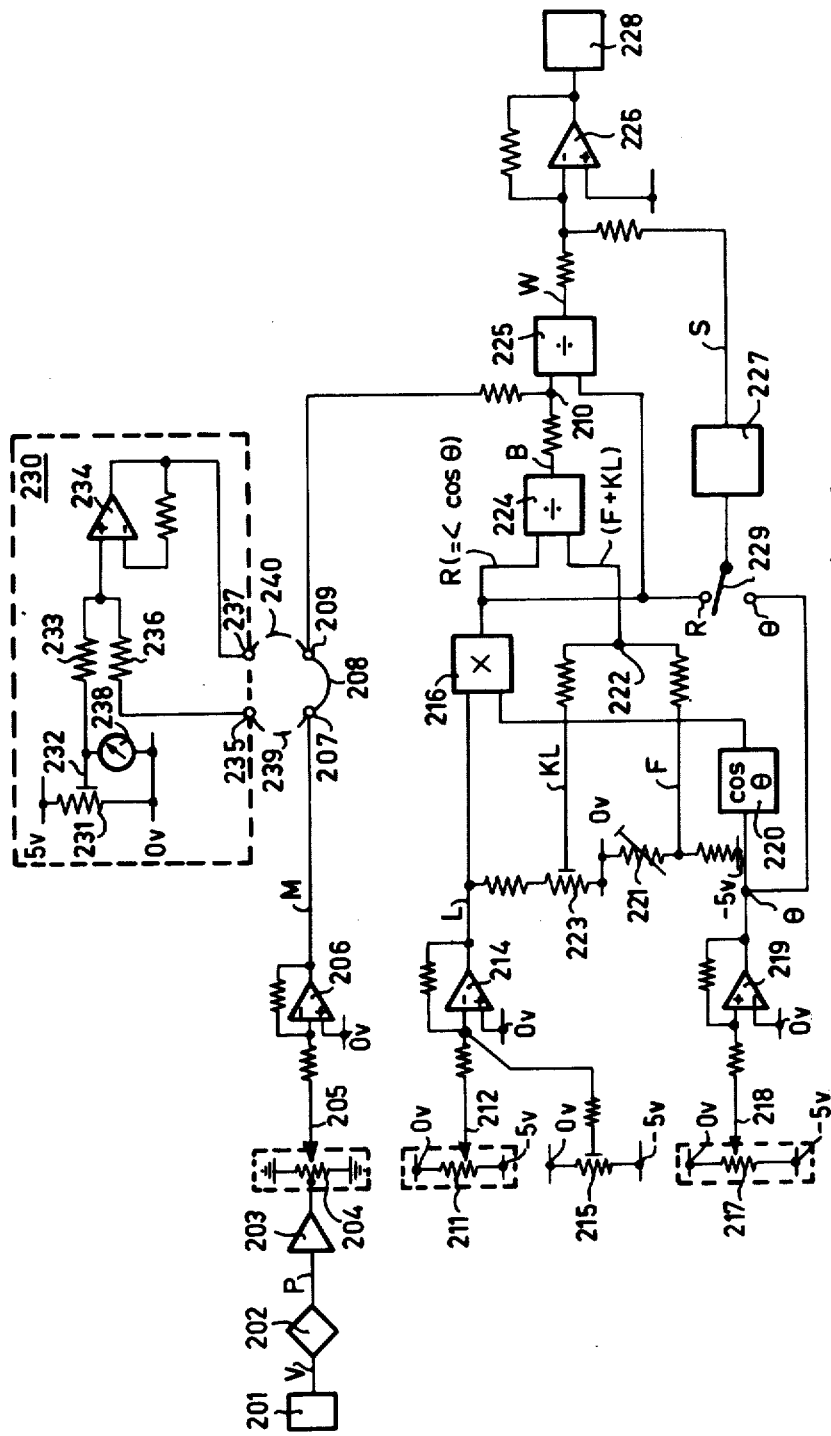
Figure 3:
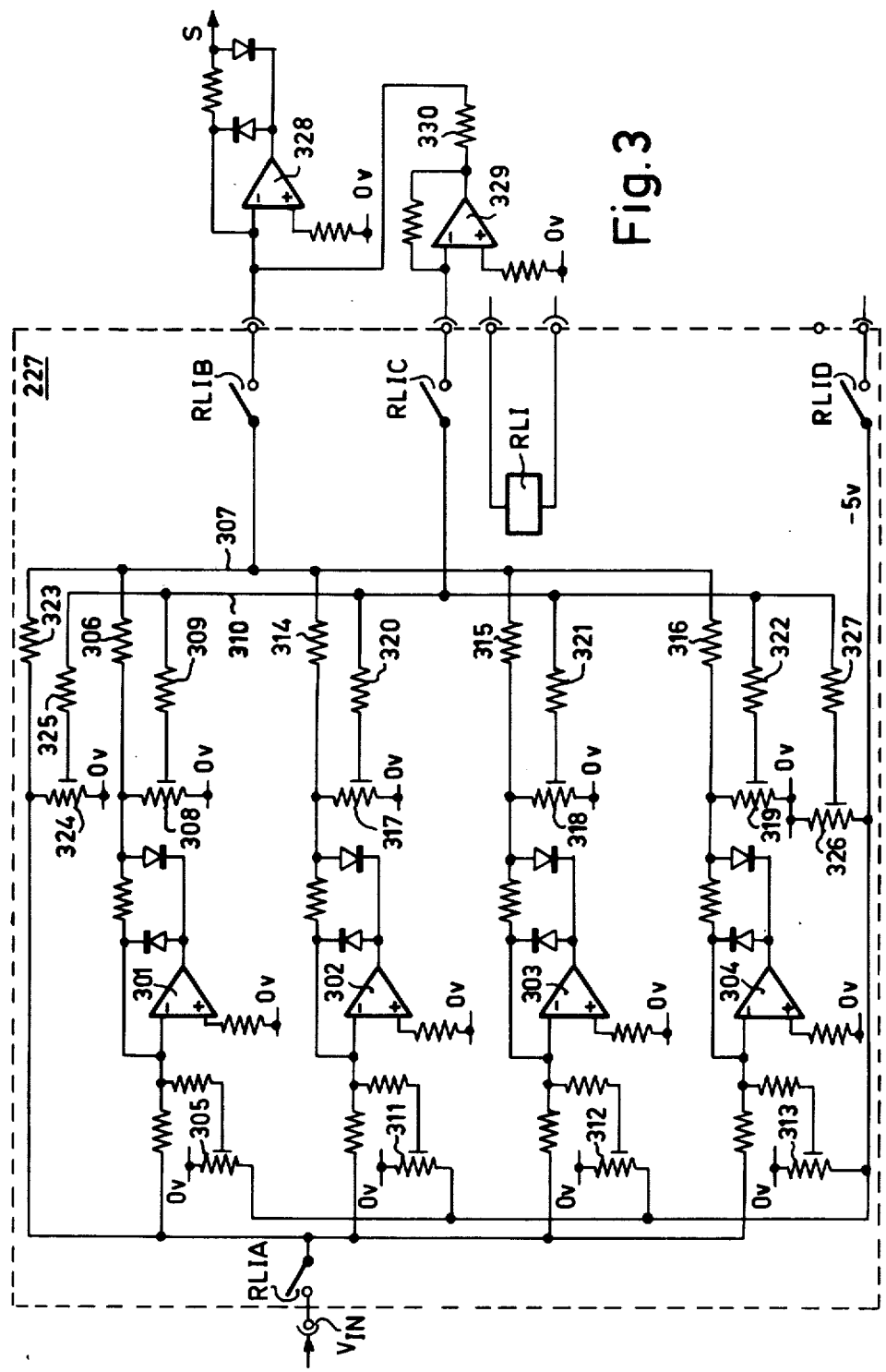
Figure 4:
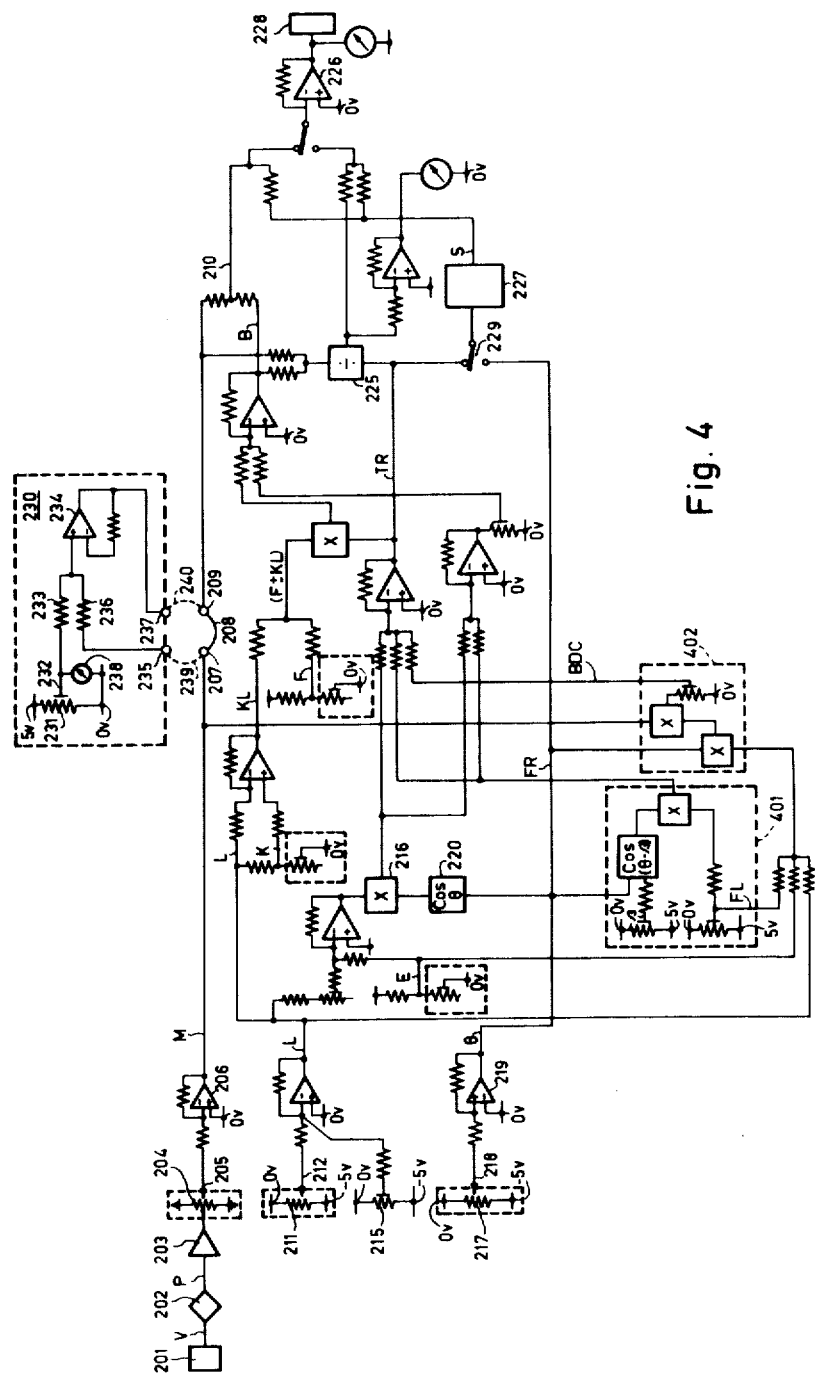
Figure 5:
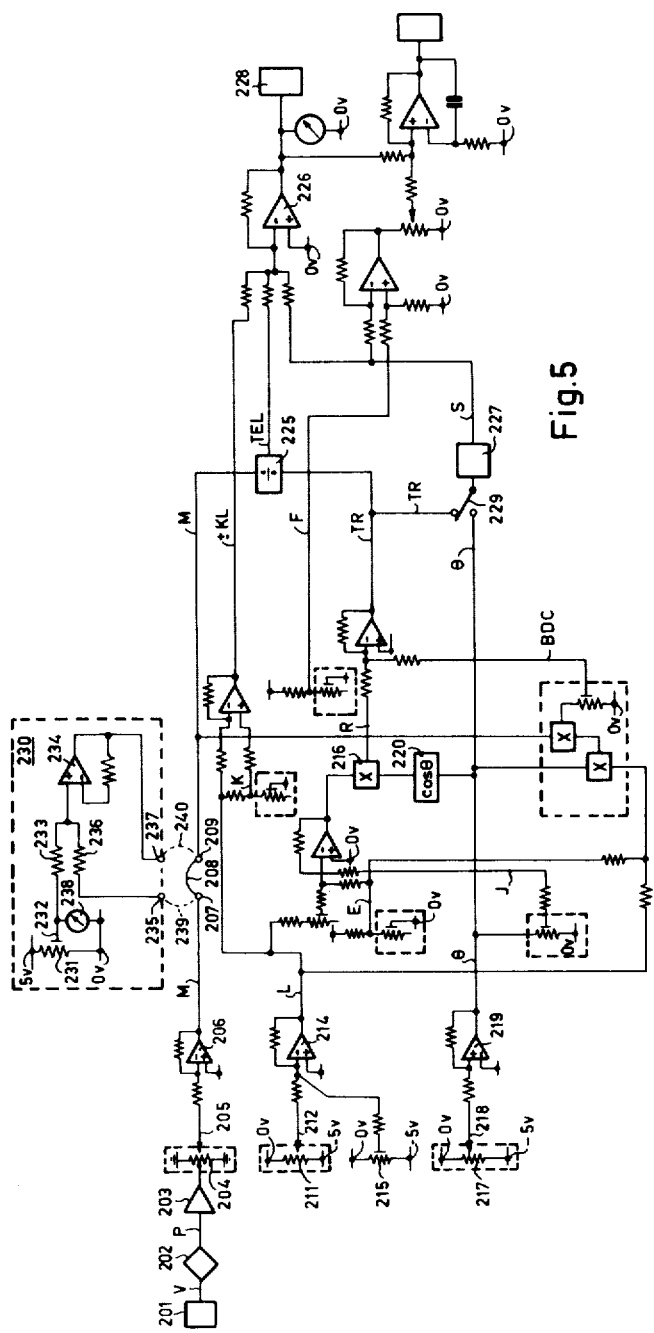

In order that the invention and the manner in which it is to be performed may be more clearly understood, embodiments thereof will be described by way of example with reference to the attached drawings, of which:

FIG. 1 is a diagrammatic representation of a mobile crane,

FIG. 2 is a simplified block diagram showing the present invention applied to a first form of safe load indicating equipment FIG. 3 is a schematic diagram of a law generator unit used in the equipment FIG. 4 is a simplified block diagram showing the present invention applied to a second form of safe load indicating equipment, and FIG. 5 is a simplified block diagram showing the present invention applied to a third form of safe load indicating equipment.

Referring first to FIG. 1, the mobile crane there shown has a boom indicated generally by the reference numeral 1 which comprises a lower section 2, an intermediate section 3 slidable telescopically within the upper end of the section 2 and an upper section 4 slidable telescopically within the upper end of the section 3. Extension means (not shown in FIG. 1) such as hydraulic rams are provided to position the section 3 with respect to the section 2 and the section 4 with respect to the section 3 so that the overall length L of the boom 1 may be adjusted to any desired value between a maximum and a minimum limit.

The lower end of the boom section 2 is pivoted to a horizontal base unit 5 at a point 6 so as to permit luffing movement of the boom 1. An hydraulic luffing ram 7 has one end of its cylinder pivoted to the base unit 6 at a point 9 and its piston rod 10, which extends through the other end of the cylinder 8, pivoted to the boom section 2 at a point 11. The axis of the boom makes an angle $\theta$ (the luff angle) with the horizontal, $\theta$ being variable by varying the extension of the luffing ram 7.

The base unit 5 is mounted upon a road vehicle chassis 12 and is arranged for rotation with respect to the chassis about a vertical axis on a slewing centre 13.

For basic duties of the crane, a load is suspended by a hoist rope 14 which passes over a sheave (not shown) at the outer end of the boom section 4 to a winding drum (also not shown). It will be seen that by varying the extension of the boom and/or the luff angle, the horizontal distance R1 between the slewing centre 13 and the hoist rope 14 can be varied so as to permit the lifting of loads located within a range of radii from the slewing centre.

For fly duties of the crane, a fly jib 15, shown in broken outline in FIG. 1, is secured to the outer end of the boom section 4 and the hoist rope 14' passes over a sheave (not shown) at its outer end. For any combination of boom extension and luff angle the horizontal distance R2 between the slewing centre 13 and the hoist rope 14' is greater than the corresponding value of R1.

A load suspended by the hoist rope 14 (14') exerts a turning moment about the boom pivot point 6. To this is added the turning moment exerted by the weight of the boom acting through its centre of gravity 16. The total turning moment is opposed by the component normal to the boom axis of the reaction of the luffing ram 7.

A first type of safe load indicating equipment suitable for cranes of the type described with reference to FIG. 1 is illustrated in FIG. 2. This equipment is described in detail in our British Pat. Specification No. 1,360,128 and will be described herein only insofar as is necessary for an understanding of the present invention.

Referring to FIG. 2, a reference signal generator 201 supplies a stable signal V to a transducer 202 which is connected to the luffing ram of the crane and is adapted to produce an output signal P which is proportional to the pressure of hydraulic fluid in the ram and hence is proportional to the total reaction sustained by the ram in supporting the boom and any load suspended therefrom. The signal P is applied via a buffer amplifier 203 to an input of a ram angle sensor unit 204. Unit 204 comprises a potentiometer mechanically coupled to the boom and the ram so that as the angle $\phi$ between the ram axis and the boom axis changes with a change of extension of the ram, the slider 205 of the potentiometer is moved along its resistive track. The track is so graded that the signal appearing at the slider 205 is equal to P sin $\phi$, i.e. the component of P normal to the axis of the boom. The slider 205 is connected to the input of an amplifier 206 which produces an output signal M (the first output signal hereinbefore referred to) proportional to P sin $\phi$, and therefore proportional to the total turning moment of the boom about its pivot. The output of the amplifier 206 is connected via a terminal 207, a link 208, and a further terminal 209 to a summing junction 210.

A boom extension sensor 211 comprises a potentiometer connected across a stabilised d.c. reference supply and mechanically coupled to the boom so that as the latter is extended from its fully retracted to its fully extended position the slider 212 is driven from end to end of the potentiometer track. The slider 212 is connected to the input of a summing amplifier 214. A signal representative of the length of the boom when fully retracted is provided by a preset potentiometer 215 connected across the reference supply and is also connected to the input of the amplifier 214, whose output is therefore a signal L representative of the total length of the boom. The signal L is applied to a first input of an analogue multiplying unit 216.

A luff angle sensor 217 comprises a potentiometer mounted for movement with the boom and connected across a d.c. reference supply. A slider 218 is gravity actuated, e.g. by a pendulum, so as to move over the track of the potentiometer as the luff angle of the boom changes. The slider 218 is connected to the input of a buffer amplifier 219 whose output is a signal proportional to the luff angle $\theta$ of the boom. The output of amplifier 219 is connected to an input of a cosine law generator unit 220 whose output signal is proportional to the cosine of the luff angle $\theta$ and is applied to a second input of the analogue multiplying unit 216. The output of unit 216 is therefore a signal proportional to L $\cos \theta = R$, the load radius (i.e. the fourth output signal hereinbefore referred to).

It can be shown that as the extension of the boom is varied, the distance of its centre of gravity from the boom pivot point is given by an expression of the form L/F+KL where F and K are constants for any one mode of operation. The turning moment of the boom about its pivot due to the weight of the boom alone is therefore proportional to L $\cos \theta + /F + KL)$.

A potentiometer chain 221 connected across a stabilised d.c. reference supply is preset to provide at its output a signal proportional to F which is applied to a summing junction 222. A further potentiometer chain 223 connected between the output of amplifier 214 and ground has applied across it a signal proportional to L and is preset to provide at its output a signal proportional to KL which is also applied to the summing junction 222. The total signal at the junction 222 is therefore proportional to F+KL and is applied to a divisor input of an analogue dividing unit 224. The signal proportional to L $\cos \theta$ appearing at the output of unit 216 is applied to a dividend input of unit 224, whose output is a signal $$B \alpha \frac{L \cos \theta}{F + KL},$$

i.e. proportional to the turning moment due to the weight of the boom alone (the second output signal hereinbefore referred to).

The output of unit 224 is connected to the summing junction 210. The signal B is arranged to have opposite polarity to the signal M so that the total signal appearing at junction 210 is (M-B), i.e. the third output signal hereinbefore referred to. This signal is applied to a dividend input of an analogue dividing unit 225. The signal R(= L $\cos \theta$) appearing at the output of the analogue multiplying unit 216 is applied to a divisor input of the unit 225, which therefore produces an output signal W representative of the load supported by the crane (the fifth signal hereinbefore referred to).

The output signal from unit 225 is applied to an input of a summing amplifier 226. A law generator unit 227 provides a signal S (the sixth output signal hereinbefore referred to) of opposite polarity to the signal W, which is also applied to the input of amplifier 226. The output of amplifier 226 therefore comprises the seventh output signal hereinbefore referred to, and is applied to a unit 228 which provides alarm and display facilities.

Means for selectively bringing into operation the law generator unit appropriate to the actual mode of operation of the crane are represented in FIG. 1 by a switch 229 adapted to connect the input of the unit 227 either to the output of the unit 216 (i.e. to the load radius signal) or to the output of the amplifier 219 (the luff angle $\theta$).

Referring now to FIG. 3, a law generator unit 227 is carried on a printed circuit board indicated by the broken line rectangle. The circuit of this unit comprises a plurality of similar threshold amplifiers indicated by the references 301, 302, 303, 304. An input signal $V_{IN}$, which can be either the load radius signal or the luff angle signal as selected by the switch 229 (FIG. 2), passes through a contact RL1A of a relay RL1, which is energised when that particular unit 227 is in use, to the inputs of each of the threshold amplifiers. Considering first the threshold amplifier 301, a bias signal of opposite polarity to $V_{IN}$ is produced at the slider of a preset potentiometer 305 (Break 1) which is connected across a reference voltage supply. The bias signal is also applied to the input of amplifier 301. The arrangement is such that when the magnitude of the input signal is less than that of the bias applied to the input of the amplifier 301, the output of the amplifier is clamped substantially at ground potential. Therefore, as the input $V_{IN}$ is varied from zero to its maximum (e.g. +5V), the output of the threshold amplifier 301 remains substantially zero until the input $V_{IN}$ reaches a value (the threshold or break value) determined by the setting of the (Break 1) potentiometer 305. Thereafter the output increases linearly with a further increase of the input $V_{IN}$, with opposite polarity and at a rate determined by the relative values of the feedback and input resistors of the amplifier. The output of the threshold amplifier 301 is connected via a resistor 306 to a first summing junction 307 and to one end of a Slope 1 potentiometer 308 whose slider is connected via a resistor 309 to a second summing junction 310.

The threshold amplifiers 302, 303 and 304 are similar to the amplifier 301 just described and are provided with respective threshold-setting potentiometers 311 (Break 2), 312 (Break 3) and 313 (Break 4). Their outputs are connected to the first summing junction 307 via respective resistors 314, 315 and 316 and to respective potentiometers 317 (Slope 2), 318 (Slope 3) and 319 (Slope 4). The sliders of the potentiometers 317, 318 and 319 are connected to the second summing junction 310 via respective resistors 320, 321 and 322. The input voltage $V_{IN}$ is applied to the first summing junction 307 via a resistor 323 and also an "Initial Slope" potentiometer 324 whose slider is connected via a resistor 325 to the second summing junction 310.

A "Shift" potentiometer 326 connected across the reference supply has its slider connected to the second summing junction 310 via a resistor 327.

The first summing junction 307 is connected via relay contact RL1B to an input terminal of an amplifier 328. The second summing junction 310 is connected via relay contact RL1C to an input terminal of an inverting amplifier 329 whose output is connected via a resistor 330 to the input terminal of amplifier 328.

The operation is as follows: ignoring for the present the second summing junction 310 and the amplifier 329, the output of amplifier 328 depends on the contributions to the first summing junction 307 from the input $V_{IN}$ from the resistor 323 and from the threshold amplifiers 301, 302, 303 and 304. As $V_{IN}$ increases from zero, current flows through resistor 323, but until $V_{IN}$ reaches the respective break points of the threshold amplifiers their outputs all remain zero. Consequently the output of the amplifier 328 initially increases linearly with $V_{IN}$ at a rate determined by the relative values of a feedback resistor 331 and the resistor 323.

When $V_{IN}$ reaches the first break point, the first threshold amplifier commences to give an output which increases linearly with a further increase of $V_{IN}$. Since this output is of opposite polarity to $V_{IN}$, the current flowing into the summing junction 307 via the resistor 306 is of opposite polarity to that flowing via the resistor 323. The net effect is that the rate of rise of input current to the amplifier 328 with an increase of $V_{IN}$ is reduced for values of $V_{IN}$ above the first break point, and the rate of increase of the amplifier's output is similarly reduced.

As the input $V_{IN}$ continues to increase it reaches successively the second, third and fourth break points, and the threshold amplifiers 302, 303 and 304 commence in turn to contribute to the input current of the amplifier 328. The result is a curve relating the output of the amplifier 328 to the input $V_{IN}$, neglecting any contribution from the amplifier 329, which comprises five linear sections whose slopes are progressively less. The break points at which the slope changes are determined by the settings of the "Break" potentiometers 305, 311, 312 and 313.

Turning now to the summing junction 310 and amplifier 329 it will be seen that the inputs to this junction comprise a fraction of the input $V_{IN}$ chosen by adjustment of the "Initial Slope" potentiometer 324 and fractions of the outputs of the threshold amplifiers 301, 311, 312 and 314 selected respectively by adjustment of the "Slope" potentiometers 308, 317, 318 and 319. Consequently the curve relating the output of the amplifier 329 to the input $V_{IN}$ comprises five linear sections whose slopes are progressively less and which individually are less than or equal to the slopes of the sections of the corresponding curve for the amplifier 328. The break points for the two curves are identical.

Since the output of the amplifier 329 is applied to the input terminal of the amplifier 328, the overall output of the latter amplifier is the difference between the two curves aforesaid. Consequently the overall characteristic is a curve comprising five linear sections, both the slopes of the individual sections and the break point at which the slopes change being independently adjustable. In addition the D.C. level of the characteristic may be varied by adjustment of the "Shift" potentiometer 326 which controls the value of a standing current flowing into the summing junction 310.

In a law generator unit for a given mode of operation, the Break potentiometers 305, 311, 312, 313 are adjusted in turn to produce successive breaks in the characteristic curve at values of $V_{IN}$ corresponding to the successive values of load radius or luff angle, as the case may be, specified in the crane manufacturer's rating table for that made. The Slope potentiometers 324, 308, 317, 318 and 319 are then adjusted in turn so that, at the successive break points, the output of the amplifier 328 is representative of the corresponding maximum safe load specified in the rating table. The overall characteristic then matches the crane rating curve within very close limits.

Referring again to FIG. 2, apparatus according to the present invention for use in the calibration of the safe load indicating equipment so as to eliminate errors caused by discrepancies between the assumed and the actual positions of the centre of gravity of the boom is shown within the chain-dotted rectangle 230. A potentiometer 231 has its resistance track connected across a stabilised d.c. reference supply, which is preferably a supply already existing in the safe load indicating equipment. A slider 232 of the potentiometer 231 is connected via a resistor 233 to an input terminal of a unity-gain non-inverting amplifier 234. A terminal 235 is also connected, via a resistor 236, to the input of the amplifier 234. The output of the amplifier is connected to a terminal 237. A meter 238 is connected to the slider 232 so as to measure the potential appearing thereon.

When the initial calibration of the equipment has been completed, the crane is set for operation in a particular mode and the boom extension and luff angle are adjusted to produce a first load radius as specified in the rating table for that mode, but no load is suspended from the boom. The link 208 is removed. The terminal 207 is connected to the terminal 235 and the terminal 237 is connected to the terminal 209, via respective links 239 and 240, shown dotted in FIG. 2. The potentiometer 231 is adjusted to produce at its slider 232 a signal X whose magnitude, as indicated by the meter 238 is equal to the previously calculated magnitude of a signal representative of the turning moment about the boom pivot point which would be produced by the weight of the maximum safe load for the existing load radius. It will be seen that this signal X is added, by the summing amplifier 234, to the signal M from the amplifier 206, which in the absence of a load is representative of the actual turning moment due to the weight of the boom alone. The combined signal X+M at the output of the amplifier 234 therefore has the same magnitude as the signal M would have if the crane were actually lifting its maximum safe load. The combined signal X+M is applied to the summing junction 210. The output of the amplifier 226 is observed, and if necessary the "Slope" potentiometer in the law generator unit 227 appropriate to the particular load radius is adjusted to reduce the output to zero.

The boom is then reset in turn to the other values of load radius specified in the rating table. For each boom setting the potentiometer 231 is adjusted to produce a signal representative of the pre-calculated turning moment due to the maximum safe load for that setting, the output of the amplifier 226 is observed and if necessary reduced to zero by adjustment of the "Slope" potentiometer appropriate to the set radius.

A similar procedure is carried out for each of the other modes of operation of the crane. The links 239 and 240 are then removed and the link 208 is replaced.

Turning to FIG. 4, the safe load indicating equipment illustrated therein is fully described in the aforesaid U.S. Pat. No. 3,965,733.

It will be seen that the means for generating the first output signal (M) the means for generating a boom length signal (L) and a luff angle signal ($\theta$) are identical with those described with reference to FIG. 2.

The circuit shown within the rectangle 401 is adapted to generate a signal FR representative of the horizontal projection of a fly jib, taking into account the length of the jib, the luff angle $\theta$ and the angle B (FIG. 1) between the axis of the boom and that of the fly jib. The circuit within the rectangle 402 is adapted to produce a signal BDC representative of the increase in load radius caused by deflection of the boom (and of the fly jib when fitted) under load. The signals FR and BDC are combined with the basic projected boom length signal R to produce a load radius signal TR. The signal R is obtained by summing the signal L and a signal E representing the distance between the boom pivot 6 and the slowing centre 13 (FIG. 1) and multiplying by cos $\theta$.

A signal BM which includes a factor of the form (F±KL) is representative of the turning moment at the boom pivot point due to the weight of the boom alone, and a signal FM is representative of the moment due to the weight of the fly jib alone. The signals BM and FM are summed to produce a signal B representative of the turning moment due to the weight of the entire load-supporting structure, and it is this signal B which in this case comprises the second output signal which is subtracted from the first output signal M, and the difference ccompared with the output of the law generator 227.

For second stage calibration of the equipment, a method and apparatus precisely as described with reference to FIG. 2 may be employed.

Turning now to FIG. 5, the apparatus illustrated therein is described in U.S. Pat. No. 3,913,690.

In this arrangement, a first output signal M, a boom length signal L and a luff signal $\theta$ are produced exactly as described with reference to FIG. 2. A load radius signal TR is generated by summing the boom length signal L, a signal J representative of the length of the fly jib (if fitted) and the signal E, multiplying the sum by cos $\theta$ to provide a signal R and adding to R a signal BDC to correct for any deflection of the boom under load.

In this instance the signal M is divided by the signal TR to produce a signal TEL representative of the effective weight, at the hook, of the load and of the boom.

A signal F±KL representative of the weight at the hook which would produce the same turning moment as does the weight of the boom acting at the centre of gravity of the boom is subtracted from TEL to give a signal representative of the weight of the load, and this is compared with the output signal S from the law generator unit 227.

Apparatus and method for second stage calibration of this equipment are as described herein with reference to FIG. 2.

What we claim is:

1. A method of calibrating a safe load indicating apparatus for use in a crane of the type having a pivoted telescopically extensible boom and a rating table for each mode of operation of the crane, said apparatus including; means for producing a first signal representative of the turning moment of the boom about its pivot point, means responsive to said first signal for producing a working output signal representative of the actual loading on the crane, law generator means having for each mode of crane operation an input/output characteristic which defines a rating curve corresponding to the crane rating table for the appertaining mode of crane operation, said law generator means providing for each mode of operation a reference output signal representative of the maximum safe loading for the crane, and means responsive to said reference and working output signals for providing an indication of available crane lifting capacity, said method comprising the steps of:

1. setting up the crane for operation in a given mode,
 2. setting the boom to a configuration specified in the rating table for that mode, but with no load suspended therefrom,
 3. injecting into the apparatus so as to be additive to the first signal a calibration signal representative of the calculated turning moment which would be produced by a load equal to the maximum safe load for the specified boom configuration thereby to produce a calibration working output signal, and
 4. adjusting the input/output characteristic of the law generator means for the appertaining mode until said reference output signal equates to said calibration working output signal and is thus representative of the maximum safe loading of the existing boom configuration.

2. A method according to claim 1 comprising the further steps of setting the boom successively to each of a plurality of the configurations specified in the rating table for the given mode, and adjusting the value of the calibration signal for each setting of the boom so that it is in each case representative of the calculated turning moment which would be produced by a load equal to the maximum safe load for that boom setting.

3. A safe load indicating apparatus for a crane having a pivotally mounted extensible boom comprising, means responsive to the crane boom for producing a first signal corresponding to the turning moment of the boom about its pivot point, law generator means having for each mode of operation of the crane an input/output characteristic defining a rating curve corresponding to the rating table for the appertaining mode of crane operation and an input terminal therefor, means for selectively applying to said input terminal a further signal that represents either the horizontal distance of the load from the boom pivot point or the boom luff angle, said further signal being independent of the crane load, and calibration means for compensating said apparatus for error caused by a discrepancy between the actual and the theoretical position of the boom center of gravity, said calibration means including a source of calibration signal whose output is adjustable to a plurality of voltage levels each corresponding to a turning moment due to the weight of the maximum safe load alone and corresponding to given position settings of the boom, and means for injecting said calibration signal into the apparatus so as to be additive to said first signal, said first signal, during a calibration operation, being produced with the boom in an unloaded condition, and said law generator means includes means for adjusting the input/output characteristic thereof during a calibration operation so as to derive a second signal indicating the maximum safe load for the crane at each given position setting of the boom.

4. Apparatus according to claim 3 further comprising, a unity-gain non-inventing amplifier having an input terminal, means for applying both the calibration signal and the first signal to said input terminal of the unity-gain non-inverting amplifier, and means for combining a signal produced at the output of the unity-gain amplifier with said second signal to provide an indication of available lifting capacity.

5. Apparatus according to claim 3 in which the source of calibration signals comprises a potentiometer connected across a stabilised reference voltage supply.

6. Apparatus according to claim 3, further comprising means for measuring the magnitude of the calibration signal.

7. Apparatus as claimed in claim 3 further comprising means for comparing a signal determined by said first signal and said calibration signal with said second signal to derive an output signal indicative of the available lifting capacity of the crane.

8. A method of calibrating a safe load indicating apparatus for a crane having a pivotally mounted telescoping boom and a rating table for each mode of crane operation, said apparatus including means for producing a first electric signal corresponding to the turning moment of the boom about its pivot point, means responsive to said first signal for producing a working output signal representative of the actual loading on the crane, law generator means having for each mode of operation of the crane an input/output characteristic which defines a rating curve corresponding to the crane rating table for the appertaining mode of crane operation, said law generator means providing for each mode of operation a reference output signal representative of the maximum safe loading for the crane, means responsive to said reference and working output signals for providing an indication of available crane lifting capacity, and means for producing a further signal independent of the crane load and representative of the load radius or boom luff angle, said method comprising the steps of: setting the crane for operation in a given mode, setting the unloaded crane boom to a predetermined position so that said first electric signal producing means derives a first electric signal corresponding to the turning moment of the unloaded boom at said predetermined boom position, producing a calibration signal corresponding to the maximum safe load turning moment for the load alone at said predetermined boom position and combining said calibration signal with said first electric signal, and applying said further signal to said law generator means and adjusting the input/output characteristic of said law generator means to derive a reference signal at said predetermined boom position.

9. The method of claim 8 comprising the further steps of setting the unloaded crane boom successively to a plurality of further predetermined positions permitted by the rating table for a given operation mode, adjusting the calibration signal for each boom setting so as to correspond to the maximum safe load turning moment for each of said boom settings, and for each of said further positions repeating said steps of combining the calibration and first electric signals, applying said further signal to said law generator means and adjusting the law generator input/output characteristic to derive said reference signal.

* * * * *